Patented Aug. 9, 1949

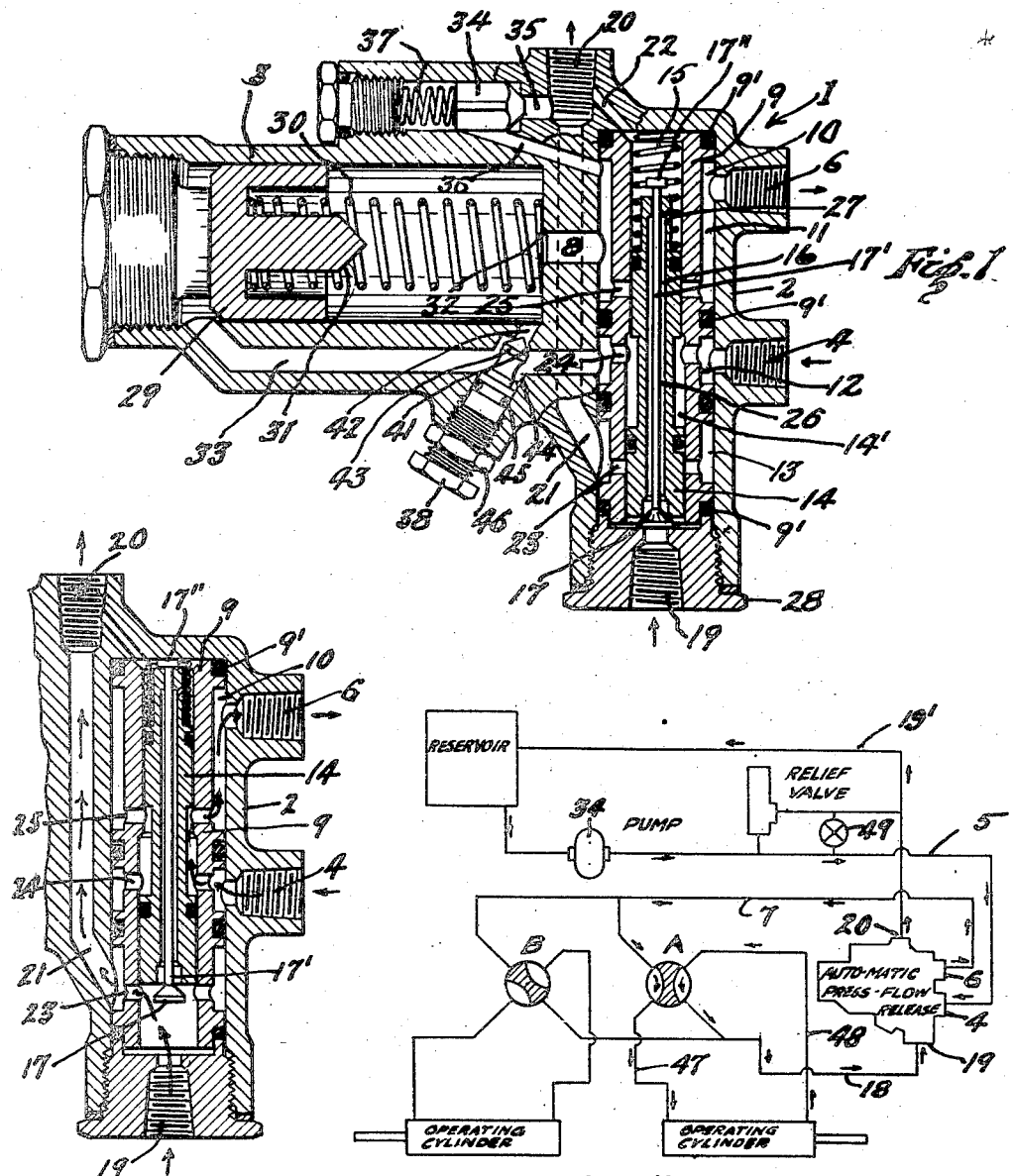

2,478,210

UNITED STATES PATENT OFFICE 2,478,210

AUTOMATIC SHUTOFF VALVE FOR HYDRAULIC TRANSMISSION SYSTEMS

Robert B. Sprague, Long Beach, and Searle G. Nevius, Santa Monica, Calif., assignors to Howard Field Application March 5, 1943, Serial No. 478,102

21 Claims. (Cl. 121—47)

This invention relates to an automatic hydraulic pressure flow cut-off valve to be used in hydraulic systems such as on aircraft. Such hydraulic systems usually consist of a reservoir for fluid supply, a power driven pump to supply pressure for moving or operating units desired to be moved to alternate positions, also valves and control means to regulate and control such pressure with piping to interconnect the units for routing fluid pressure as desired. Occasionally the pipes in such systems will break from vibration, fatigue, gun fire or other reasons thereby disrupting the system.

Our automatic hydraulic pressure cut-off valve may be included in such systems so that the pressure supply to the four-way selector valves and return flow from these four-way valves will pass through our valve which will control the fluid in the pipes connected to the four-way valves and the operating cylinder or motor. Our valve will control the fluid flowing to and from such operating cylinder or motor so that if one of the connecting lines should be broken the valve will not open and the pressure supply to the broken line will be blocked off. This blocking off eliminates any excessive loss of fluid so that the remaining fluid in the system may be used to operate another cylinder or motor connected to the same pressure supply source.

It is an object of our invention to provide a novel automatic fluid pressure valve of the character stated which is controlled by the flow of the fluid in the return line, the valve in turn controlling the pressure supply.

Another object of our invention is to provide an automatic fluid pressure valve which includes a displacement unit such as a cylinder with a piston therein. The piston is held at one end by a spring or equivalent means and the corresponding end of the cylinder is connected to the pressure inlet of the control valve, the opposite end of the cylinder being connected to the pressure outlet port. This provides a means of sending a test sample of fluid through a selected circuit which will move the piston against spring pressure toward the outlet port thereby displacing fluid into the selected circuit and thereby starting the return flow from cylinder or motor which will in turn open direct pressure supply from the pressure inlet to the pressure outlet port in the automatic valve. When such flow is established, the piston will be returned by spring pressure to its original position due to equal fluid pressure on both sides of piston. Should the selected circuit pipe be broken, the fluid displaced by the piston will flow out the break. Thus, there will be no return flow back to the valve to the open pressure inlet port to the pressure outlet port and only the amount of fluid displaced by the piston will be lost.

Another object of our invention is to provide a simple and novel means of moving a valve to open a passage from the inlet pressure port to the outlet pressure port by means of the return flow of fluid from the operated circuit.

A feature of our invention is the unbalancing of the controlling valve which is acted upon by return flow so that pressure at the pressure inlet port always tends to close the valve to shut off pressure supply to the circuit should a break occur in a pipe in the operating circuit at a time when flow is actually going through the pipes of the circuit. In this mode of operation, pressure in the return line to open the control valve is less than the pressure supplied at inlet pressure port tending to keep or return the valve to a closed position.

Another feature of our invention is the provision of a valve which when opened will provide a bypass from the pressure inlet port to the pressure outlet port to facilitate the circulation of fluid during initial operation of the system for the purpose of circulating fluid through the system to wash or remove air from the system, as the valve will not function in a system when excessive air is trapped in the pipes and cylinders. Such a valve may also be used to reset the displacement piston after the four-way valve has a broken line by putting the four-way valve in its neutral position.

Other objects, advantages and features of the invention will appear from the accompanying drawing, the subjoined detailed description and the appended claims. In the drawing, which is for illustrative purposes only:

Fig. 1 is a sectional view of our automatic fluid pressure valve;

Fig. 2 is a sectional view of a portion of the valve shown in Fig. 1, the parts being positioned to show the open position of the valve; and Fig. 3 is a diagrammatic view of a hydraulic system including our valve.

Referring more particularly to the drawing, our fluid pressure valve 1 comprises a valve body 2 and a cylinder 3 which may be an integral part of the body 2, or which may be operatively connected to the body, or which may be otherwise suitably attached to the body. The valve body 2 includes a fluid pressure inlet port 4 into which the pressure flow line from the pump extends as shown diagrammatically at 5 in Fig. 3. A fluid pressure outlet or exhaust port 6 is also provided in the body 2 to which is connected the primary fluid pressure line leading to the four-way selector valve A. This fluid pressure line is shown diagrammatically at 7 in Fig. 3.

A duct or passage 8 extends from the inner end of the cylinder 3 in the valve body 2 in open communication with the port 6 as will be further described. A cylindrical cage or retainer 9 is fixedly mounted in a bore 10 in the valve body 2. This cage is reduced in diameter to provide an annular space or chamber 11 which connects the duct 8 and the port 6 as shown in Fig. 1. The cage 9 is also reduced in diameter at another portion of its length providing a chamber 12 opposite the port 4. Near its lower end the cage 9 is reduced in diameter to provide an annular chamber 13, the purpose of which will be subsequently described. Seals 9' are provided between said chambers to provide pressure seals therebetween.

A control valve 14 is slidably mounted in the cage 9 and is pressed downwardly by the spring 15. The valve 14 is provided with a counterbore 16 and a pilot valve 17 having a stem 17' extending through the counterbore 16 of the valve 14. The stem is provided with a head 17'' on its upper end engageable with the upper end of the valve 14. The valve 17 seats against the lower end of the counterbore 16, thereby sealing the counterbore when the control valve 14 is in its lower position. When the control valve 14 is raised it is forced against the head on the upper end of valve stem 17', which head engages the upper end of the bore 10 under such conditions. The valve 14 is recessed to form a chamber 14' which is in open communication with ports 24 when the valve is in the position shown in Fig. 1 and in open communication with ports 24 and 25 when in the position shown in Fig. 2.

The return flow line 18 is connected to a port 19 so that the return flow tends to lift the slide valve 14 until ports 23 are opened, thereby allowing flow through the ports 23 to the chamber 13 and thence to a passage 21 so long as there is a flow of fluid through the return line 18. The return flow line 19' (see Fig. 3) extends from the port 20 and thence either to a reservoir or to a pressure pump. As thus far described, it is believed to be evident that if any of the lines 7, 18 or any of the other lines connected to the selector valves A and B or the operating cylinders should be broken either accidentally or by gun fire, then our fluid pressure valve will automatically function to prevent the leakage of fluid through such a broken line.

A duct 22 extends from the return outlet port 20 into the space above the valve 14, thereby permitting fluid to pass out of the space above the slide valve and preventing a fluid lock. The ports 23 in the cage 9 open into the chamber 13, the ports 24 open into the chamber 12. The slide valve 14 is reduced in diameter opposite the ports 24 so that the fluid under pressure coming in at the port 4 together with the spring 15 will tend to seat the slide valve as already described.

The stem of the valve 17 extends into a chamber 26 formed as a part of the counterbore 16 of the valve 14, and a restriction port 27 leads from this chamber to the space above the control valve 14 to permit return fluid to pass upwardly and thence through the duct 22 and into the return flow outlet 20. The valve 17 is held in its closed position when the valve 14 is lowered by engaging the inner end of a nut 28 threaded into the bottom of the valve housing 2.

A piston 29 is mounted in the cylinder 3 and is pressed towards the outer end of the cylinder by the coil spring 30. The inner end of the piston 29 is tapered as shown at 31 to form a valve member adapted to engage the seat 32 on the outer end of the duct 8 when the piston is pressed inwardly to its fullest extent. When the piston is so seated, no fluid can pass outwardly through the duct 8 around annular chamber 11 and thence to the port 6.

A conduit 33 may be an integral part of the cylinder 3 or may be a separate tube if desired. This conduit is open at one end to the primary intake port 4 through the annular chamber 12 and the other end of the conduit extends back of the piston 29. Thus, fluid under pressure acts against the outer end of the piston 29 urging the piston inwardly towards its seat 32. A one-way check valve 34 is arranged between the pressure outlet 6 and the fluid return outlet 20 and may be arranged within the body of the cylinder 3, substantially as shown. A duct 35 extends into the fluid return outlet port 20 and the valve 34 seats on the end of this duct, thereby normally closing the same. A second duct 36 extends from the chamber 11 and into the bore of the check valve, substantially as shown, so that fluid can flow into the system from the return line 19' and thence into the cylinder 3 on the spring side of the piston 29 if the pressure on the opposite side of the piston is released. A light spring 37 normally holds the valve 34 in its closed position.

The valve body 2 also is provided with a bore for a manually operated valve 38 normally seated on a seat 41 sealing off a passage 42 leading from the passage 33 into the inner end of the cylinder 3. This valve is provided with a sealing means 45 to prevent external leakage of fluid. A check nut 46 is provided to lock the valve 38 in place. The valve 38 may be opened to allow fluid from the inlet port 4 to flow through the annular chamber 12 to the passage 33 past the seat 41 into the passage 42 leading to the inner side of the piston 29. Subsequently, the fluid flows through the passage 8 to the annular chamber 11 and out the port 6, thus by-passing the slide valve 14 and the piston 29 to provide for circulating fluid in the circuit to remove air from the system. After this is done the valve 43 is then seated and locked during normal operation of the valve proper.

Consider the circuit as shown diagrammatically in Fig. 3 as an example. In operation, assuming that all the lines are intact and all parts of the system are full of fluid, all circuits of the system having previously been purged of all air possible by opening the bypass valve 38 as previously explained. The valve 38 again being seated and locked in place, the pump 34 supplies pressure flow through the line 5 into the automatic fluid pressure valve 1, such flow being through the pressure inlet port 4, the recess 12 and the passage 33 into the outer end of the cylinder 3 to act against the piston 29. The piston 29 then moves inwardly urging the fluid in front of the piston through the duct 8 and into the chamber 11 and out through the outlet pressure port 6 into the pipe 7. From the latter, the fluid flows through the manually operated four-way selector valve A to the operating cylinder connected thereto. The flow from the operating cylinder is referred to as return flow.

The return flow takes place through line 48 and through the four-way valve into the line 18 and thence into the return inlet port 19 of the automatic fluid pressure valve. The return flow forces the slide valve 14 into the position shown in Fig. 2 so that the valve 14 simultaneously opens the ports 23 and 25. The ports 24 remain open and consequently there is a pressure flow from the port 4 through the ports 24 and the annular recess around the slide valve 14 to the ports 25 and thence into the chamber 11, from which it flows out the port 6 to continue the pressure supply to the operating cylinder and to cause the return flow to continue, thus holding the valve 14 in its open position. Pressure flow also enters the inner end of the cylinder 9 from the recess 11 through the passage 8 to balance the fluid pressure on both sides of the piston 29, thereby allowing the spring 30 to return the piston to the outer end of the cylinder as shown in Fig. 1.

As the valve 14 is forced to its open position, Fig. 2, by return flow, fluid at the opposite end of the valve 14 is displaced through the passage 22 into the port 20 and subsequently into the return line to the reservoir. The return flow which opens the valve 14 passes out through the ports 23 into the chamber 13, then into the passage 21 to the port 20, and thence into the return line to the reservoir to complete the flow cycle. The moving of the valve 14 to its open position by the return flow causes the head on the stem of the valve 17 to hit the valve body, thereby opening the valve 17, as shown in Fig. 2, so that when the piston in the operating cylinder has reached the end of its stroke, or when the four-way selector valve is moved to a neutral position, the return flow is stopped and the valve 14 will return to the position shown in Fig. 1. Fluid trapped in the return line as the valve 14 passes over the ports 23 will flow past the valve 17 into the chamber 26, out the port 27 and through the passage 22 to the return outlet port 20. When the valve 14 returns to its lower position it also causes the valve 17 to reseat. Thus, the complete valve is reset such that when the system just referred to is again selected to operate, the automatic valve will again function to release pressure to the operating cylinder.

In the operation of the valve, should the system with a broken line be selected to be operated, such as one of the lines 47 or 48, the fluid displaced into the system by movement of the piston 29 would flow out the broken line so that no return flow would be available to raise the valve 14 to its open position and the passages connecting the pressure ports 4 and 6 would remain closed. Also, the piston 29 would seat against the seat 32, thereby shutting off any more flow from this source so that the fluid lost out of the broken line would be only the amount of fluid displaced by the piston 29 moving inward to seal off the port 8.

Should it be desired to operate a second circuit, for instance, such a circuit as that controlled by a second four-way valve B (see Fig. 3), the operation would be as follows: After the piston 29 has seated to seal off the pressure flow, the valve 14 remaining in its closed position as shown in Fig. 1, the selector valve in the broken system may be returned to neutral, thereby shutting off the broken line from the system. By opening the valve 49 the pressure in the supply system will be released and the pressure holding the piston 29 against the seat 32 will also be released, whereupon the spring 30 will force the piston outward and fluid required to fill the cylinder at the inner side of the piston will be sucked from the return line at the return outlet port 20 through the passage 35 past the valve 34 through the passage 36 into the chamber 11 and through the port 8 into the cylinder, thus resetting the piston 29 for another operation of the automatic valve in a system which has no broken lines or units. The valve 49 should then be closed to cause pressure to be built up in the pressure system controlled by the four-way valve B. Some hydraulic systems are arranged such that when pressure is not required, a valve similar to the valve 49 may be provided to allow the pump to circulate fluid at a lower pressure (back pressure due to loss in the system only). In such systems the valve would automatically reset itself.

We claim as our invention:

1. In an automatic fluid pressure valve: a valve body having a fluid pressure inlet port, a fluid pressure outlet port, a return inlet port, and a return outlet port; a cylinder communicating at one end with said fluid pressure inlet port and at the other end with said fluid pressure outlet port; a piston in said cylinder; elastic means urging said piston toward the end of said cylinder which communicates with said fluid pressure inlet port, said piston being movable toward the other end of said cylinder to displace fluid through the fluid pressure outlet port; valve means controlling fluid flow between said fluid pressure inlet and fluid pressure outlet ports; and means operable by return fluid through the return inlet port to open said valve means.

2. In an automatic fluid pressure valve; a valve body having a fluid pressure inlet port, a fluid pressure outlet port, a return inlet port, and a return outlet port; a chamber communicating at one end with the said fluid pressure inlet port and at the other end with the said fluid pressure outlet port; a movable fluid separating means disposed within said chamber, and adapted to displace fluid through said fluid pressure outlet port; valve means controlling flow between said fluid pressure inlet and fluid pressure outlet ports; and means operable by return fluid through the return inlet port to open said valve means.

3. In an automatic fluid pressure valve: a valve body having a fluid pressure inlet port, a fluid pressure outlet port, a return inlet port, and a return outlet port; a chamber communicating at one end with the said fluid pressure inlet port and at the other end with the said fluid pressure outlet port; a movable fluid separating means disposed within said chamber and adapted to displace fluid through said fluid pressure outlet port; valve means controlling flow between said fluid pressure inlet and fluid pressure outlet ports; means operable by return fluid through the return inlet port to open said valve means; and a manually controlled valve to interconnect both ends of said chamber.

4. An automatic fluid pressure valve comprising a valve body having a fluid pressure inlet port, a fluid pressure outlet port, a return inlet port, and a return outlet port; a cylinder open at one end to the fluid pressure inlet port and at the other end to the fluid pressure outlet port; a pressure controlled shut-off means in the cylinder, said means comprising a piston, a seat at the end of said cylinder open to the fluid pressure outlet port against which seat the piston may be forced by pressure in the other end of the cylinder; valve means controlling the fluid flow between the fluid pressure inlet and fluid pressure outlet ports; and means operable by the return fluid through the return inlet port to open said valve means.

5. In an automatic fluid pressure valve: a valve body having a fluid pressure inlet port, a fluid pressure outlet port, a return inlet port, and a return outlet port; a cylinder open at one end to the fluid pressure inlet port and at the other end to the fluid pressure outlet port; means disposed within said cylinder adapted to automatically shut off fluid flow from said cylinder to said fluid pressure outlet port after passage of a predetermined limited quantity of fluid from the cylinder to the fluid pressure outlet port; valve means controlling fluid flow between said fluid pressure inlet and fluid pressure outlet ports; and means operable by return fluid through the return inlet port to move said valve means to permit fluid flow between said fluid pressure inlet and outlet ports.

6. In an automatic fluid pressure valve: a valve body having a fluid pressure inlet port, a fluid pressure outlet port, a return inlet port, and a return outlet port; a cylinder open at one end to the fluid pressure outlet port and open at the other end to the fluid pressure inlet port; a movable piston in said cylinder, said piston being adapted to displace fluid through said fluid pressure outlet port; fluid pressure shut-off means carried by said piston; valve means controlling fluid flow between said fluid pressure inlet and fluid pressure outlet ports; and means operable by the return fluid through the return inlet port to move said valve means to permit fluid flow between said fluid pressure inlet and outlet ports.

7. In an automatic fluid pressure valve: a valve body having a fluid pressure inlet port, a fluid pressure outlet port, a return inlet port, and a return outlet port; a chamber open at one end to the fluid pressure inlet port and at the other end to the fluid pressure outlet port; a fluid displacing and shut-off means adapted to displace fluid from said chamber through the fluid pressure outlet port disposed within said chamber; a slide valve controlling fluid flow between said fluid pressure inlet and fluid pressure outlet ports and adapted to be opened by return fluid pressure; said valve body having a duct extending from the return fluid outlet port to the space above said slide valve; said slide valve having a fluid passage extending therethrough; a valve controlling fluid flow through said passage, said last named valve being open to permit flow through said passage when the slide valve is in position to open communication between the fluid pressure inlet and fluid pressure outlet ports.

8. In an automatic fluid pressure valve: a valve body having a fluid pressure inlet port, a fluid pressure outlet port, return inlet port, and a return outlet port; a chamber communicating at one end with said fluid pressure inlet port and means disposed within said chamber adapted to displace fluid through said pressure outlet port; valve means controlling flow between said fluid pressure inlet and outlet ports; means operable by pressure of the return fluid to open said valve means; said valve body having a passage connecting said fluid pressure outlet port, said return outlet port, and a check valve disposed in said passage.

9. In an automatic fluid pressure valve; a valve body having a fluid pressure inlet port, a fluid pressure outlet port, a return inlet port, and a return outlet port; a cylinder open at one end to the fluid pressure inlet port and at the other end to the fluid pressure outlet port; means disposed within the cylinder to shut off fluid flow after fluid in the cylinder has been displaced through the said fluid pressure outlet port; said body having a first passage connecting said fluid pressure inlet and fluid pressure outlet ports; said body having a second passage connecting said return inlet and outlet ports; and valve means controlling fluid flow through said first passage, and means operable by return fluid through the return inlet port to move said valve means to permit fluid to flow through said first passage and said second passage.

10. In a fluid pressure system; a fluid pressure line, a valve which is disposed in said fluid pressure line and which is normally closed to prevent flow through said fluid pressure line, means operable by fluid pressure in said fluid pressure line upstream from said valve for introducing a limited, predetermined quantity of fluid into said fluid pressure line downstream from said valve when said valve is closed; work means operable by flow of fluid in the fluid pressure line, a return flow line connected to the work means and means operable by the pressure in said return flow line to open said valve, said return flow line receiving fluid from the work means whenever the work means is operated by fluid in the fluid pressure line.

11. An automatic shut-off valve comprising a valve body having a primary inlet port and a primary outlet port; a chamber communicating at one end with the primary inlet port and at the other end with the primary outlet port; means within said chamber to prevent more fluid than is contained within said chamber from being displaced through said primary outlet port by entry of fluid to said chamber from said primary inlet port, said valve body having a valve chamber therein which provides fluid communication between said primary inlet port and said primary outlet port; valve means disposed in said valve chamber and movable from a closed position to an open position, said valve means preventing flow from said primary inlet port to said primary outlet port when in said closed position, said valve body having a return intake port and a return exhaust port; and means operable by fluid pressure in said return intake port to move said valve means to said open position.

12. In an automatic fluid pressure valve: a valve body having a primary inlet port, a primary outlet port, a return inlet port, and a return outlet port; a cylinder communicating at one end with said primary inlet port and at the other end with said primary outlet port; a piston in said cylinder, said piston being movable toward said other end of said cylinder to displace fluid through said primary outlet port; valve means for controlling fluid flow between said primary inlet port and said primary outlet port; and means operable by fluid flow through said return inlet port to open said valve means.

13. In a fluid pressure system, the combination of: supply means for supplying fluid under pressure; actuator means adapted to be operated by said fluid; a supply line connecting said supply means and said actuator means for supplying said fluid to said actuator means; a return line connecting said actuator means and said supply means; and automatic shut-off valve means in said lines, including a valve which is normally closed in said supply line to prevent fluid flow therethrough to said actuator means but adapted to be opened to permit such flow, and means operatively connected to said valve and to said return line and operable in response to a flow of fluid from said actuator through said return line to open said valve.

14. In a fluid pressure system, the combination of: supply means for supplying fluid under pressure; actuator means adapted to be operated by said fluid; a supply line connecting said supply means and said actuator means for supplying said fluid to said actuator means; a return line connecting said actuator means and said supply means; and automatic shut-off valve means in said lines, including a valve which is normally closed in said supply line to prevent fluid flow therethrough to said actuator means but adapted to be opened to permit such flow, priming means in said supply line and adapted in response to fluid pressure in said supply line to move a quantity of fluid through said supply line to said actuator means while said valve is closed so as to energize said actuator means to cause a flow of fluid in said return line from said actuator means, and means operatively connected to said valve and to said return line and operable in response to a flow of fluid from said actuator means through said return line to open said valve.

15. In a fluid-operated system, a source of fluid under pressure, a fluid motor, supply and return lines connecting said motor to said source, a valve which is normally biased to prevent flow of fluid from said source to said motor, means which is responsive to the pressure of the fluid in that portion of said supply line between said valve and said source and which is operative to effect a displacement of the fluid in that portion of the supply line between said valve and said motor to thereby initiate the operation of said motor and effect a displacement of the fluid in said return line, and means which is operative in response to said last mentioned displacement to open said valve to permit fluid to flow from said source to said motor and fluid to flow from said motor to said source, said last named means being thereafter operative to hold said valve open so long as the flow of fluid through said return line is uninterrupted.

16. In a fluid-operated system, a source of fluid under pressure, a double-acting fluid motor, supply and return lines connecting said motor to said source, a valve for controlling the direction of flow of said fluid to said motor, a second valve which is normally biased to prevent flow of said fluid from said source to said motor, means which is movable in response to the pressure of the fluid in that portion of said supply line between said second valve and said source and which is operative to effect a displacement of the fluid in that portion of the supply line between said second valve and said motor to thereby initiate the operation of said motor and effect a displacement of the fluid in said return line, and means which is operative in response to said last mentioned displacement to open said second valve and permit fluid to flow from said source to said motor and fluid to flow from said motor to said source, said last named means being thereafter operative to hold said second valve open so long as the flow of fluid through said return line is uninterrupted.

17. In a fluid-operated system, a source of fluid under pressure, a fluid motor, supply and return lines connecting said motor to said source, an automatic control device having a passage through which fluid traversing the supply line may flow and a second passage through which fluid traversing the return line may flow, a valve normally biased to prevent flow of said fluid through said first mentioned passage, means responsive to the fluid pressure ahead of said valve for effecting a displacement of fluid in said supply and return lines, and means responsive to the displacement of the fluid in said return line for opening said valve, said last named means being thereafter operative to hold said valve open so long as the flow of fluid through said return line is uninterrupted.

18. In a fluid operating system: a source of fluid under pressure; a fluid motor; supply and return lines connecting said motor to said source; a first valve which is normally biased to prevent flow of said fluid from said source to said motor; means which is movable in response to the pressure of the fluid in that portion of said supply line between said first valve and said source and which is operative to effect a displacement of the fluid in that portion of the supply line between said first valve and said motor to thereby initiate the operation of said motor and effect a displacement of the fluid in said return line; means which is operative in response to said last mentioned displacement to open said first valve and permit fluid to flow from said source to said motor and fluid to flow from said motor to said source; and a second valve in said lines between said first valve and said motor for controlling the direction of flow of said fluid to said motor.

19. In a fluid operating system: a source of fluid under pressure; a plurality of fluid motors; supply and return lines connecting said motors to said source; a first valve which is normally biased to prevent flow of said fluid from said source to any of said motors; means which is movable in response to the pressure of the fluid in that portion of said supply line between said first valve and said source and which is operative to effect a displacement of the fluid in that portion of the supply line between said first valve and said motors to thereby initiate the operation of one of said motors and effect a displacement of the fluid in said return line; means operative in response to said last mentioned displacement to open said first valve and permit fluid to flow from said source to said motors and fluid to flow from said motors to said source, said motors being connected in parallel to said supply and return lines; and a second valve for each of said motors in said lines between said first valve and each of said motors for separately controlling the direction of flow of said fluid to each of said motors.

20. In an automatic fluid pressure valve: a valve body having a fluid pressure inlet port, a fluid pressure outlet port, a return inlet port, and a return outlet port; a chamber communicating at one end with said fluid pressure inlet port and at the other end with said fluid pressure outlet port; a movable piston disposed within said chamber, and adapted to displace fluid through said fluid pressure outlet port; valve means controlling flow between said fluid pressure inlet and fluid pressure outlet ports, said valve means being at all times exposed to the fluid pressure in said fluid pressure inlet port; and means operable by a return fluid flow through said return inlet port to open said valve means.

21. In an automatic fluid pressure valve: a valve body having a fluid pressure inlet port, a fluid pressure outlet port, a return inlet port, and a return outlet port; a chamber communicating at one end with said fluid pressure inlet port and at the other end with said fluid pressure outlet port; a movable piston disposed within said chamber and movable from a first to a second position therein to displace fluid through said fluid pressure outlet port; valve means controlling flow between said fluid pressure inlet and fluid pressure outlet ports; and means operable by return fluid flow through said return inlet port to open said valve means to permit flow from said fluid pressure inlet port to said fluid pressure outlet port, said piston automatically moving from said second to said first position when said valve means is opened without disrupting said flow between said fluid pressure inlet and said fluid pressure outlet ports.

ROBERT B. SPRAGUE.
SEARLE G. NEVIUS.

REFERENCES CITED

The following references are of record in the file of this patent:

UNITED STATES PATENTS

| Number | Name | Date |
|---|---|---|
| 2,428,150 | Field | Sept. 30, 1947 |